US009817688B2

(12) United States Patent
Kaplan et al.

(10) Patent No.: US 9,817,688 B2
(45) Date of Patent: Nov. 14, 2017

(54) IDENTIFYING AND PREVENTING REMOVAL OF VIRTUAL HARDWARE

(71) Applicant: Red Hat Israel, Ltd., Raanana (IL)

(72) Inventors: Alona Kaplan, Raanana (IL); Michael Kolesnik, Ramat Gan (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/625,557

(22) Filed: Feb. 18, 2015

(65) Prior Publication Data
US 2016/0239327 A1    Aug. 18, 2016

(51) Int. Cl.
*G06F 9/455*    (2006.01)

(52) U.S. Cl.
CPC ............. *G06F 9/45558* (2013.01); *G06F 2009/45579* (2013.01); *G06F 2009/45591* (2013.01)

(58) Field of Classification Search
CPC ....... G06F 9/45558; G06F 2009/45579; G06F 2009/45591
USPC .......................................................... 718/1
See application file for complete search history.

(56) References Cited

U.S. PATENT DOCUMENTS

| 7,996,579 | B2 | 8/2011 | Hahn et al. | |
|---|---|---|---|---|
| 8,190,676 | B2 | 5/2012 | Momchilov et al. | |
| 8,301,860 | B2 | 10/2012 | Cyr et al. | |
| 8,566,822 | B2* | 10/2013 | Diab ................. | G06F 9/5077 718/1 |
| 8,732,704 | B2* | 5/2014 | Martins .............. | G06F 8/63 718/1 |
| 8,856,788 | B2 | 10/2014 | Tsirkin et al. | |
| 9,459,908 | B2* | 10/2016 | Anand ............... | G06F 9/45558 |
| 2001/0043700 | A1* | 11/2001 | Shima ............... | H04L 29/06 379/399.01 |
| 2007/0011446 | A1* | 1/2007 | Kato ................. | G06F 21/305 713/150 |
| 2007/0162594 | A1 | 7/2007 | Henry et al. | |
| 2008/0168460 | A1* | 7/2008 | Lee .................. | G06F 9/5016 718/104 |
| 2008/0320123 | A1* | 12/2008 | Houlihan ........... | G06F 9/4856 709/224 |
| 2009/0210527 | A1* | 8/2009 | Kawato .............. | G06F 9/45558 718/1 |
| 2010/0146506 | A1* | 6/2010 | Lee .................. | G06F 9/455 718/1 |
| 2010/0251255 | A1* | 9/2010 | Miyamoto .......... | G06F 9/4856 718/104 |

(Continued)

OTHER PUBLICATIONS

Iqbal et al. "Adaptive resource provisioning for read intensive multi-tier applications in the cloud", 2010, Elsevier.*

(Continued)

*Primary Examiner* — Anna Deng
*Assistant Examiner* — Junchun Wu
(74) *Attorney, Agent, or Firm* — Lowenstein Sandler LLP (57) ABSTRACT

A virtualization manager receives a request to disconnect a virtual device associated with a virtual machine. The virtualization manager then determines a usage state of the virtual device in view of collected usage statistics for the virtual device. Responsive to determining that the determined usage state of the virtual device indicates that the virtual device is in use, the virtualization manager requests confirmation for disconnecting the virtual device from the virtual machine.

17 Claims, 7 Drawing Sheets

(56) References Cited

U.S. PATENT DOCUMENTS

| | | | | |
|---|---|---|---|---|
| 2010/0330953 | A1* | 12/2010 | Rogel | G06F 9/45537 718/1 |
| 2011/0179417 | A1* | 7/2011 | Inakoshi | G06F 9/45558 718/1 |
| 2011/0307887 | A1* | 12/2011 | Huang | G06F 1/3228 718/1 |
| 2011/0307900 | A1* | 12/2011 | Fatehpuria | G06F 9/50 718/104 |
| 2012/0306658 | A1 | 12/2012 | Karaffa et al. | |
| 2013/0145364 | A1* | 6/2013 | Yang | G06F 9/45558 718/1 |
| 2014/0040895 | A1* | 2/2014 | Peng | G06F 9/45533 718/1 |
| 2014/0068607 | A1 | 3/2014 | Tsirkin et al. | |
| 2015/0227383 | A1* | 8/2015 | Yoon | G06F 9/45558 718/1 |
| 2015/0355924 | A1* | 12/2015 | Holla | G06F 9/45558 718/1 |

OTHER PUBLICATIONS

Xiao et al. "Dynamic Resource Allocation Using Virtual Machines for Cloud Computing Environment", Jun. 2013, IEEE vol. 24, No. 6.*

Mingsong et al. "Optimization in dynamic allocation of network bandwidth campus based on Xen", 2014, IEEE.*

Kansal et al. "Virtual Machine Power Metering and Provisioning", Jun. 2010, ACM.*

Doran Holan et al., "Virtual PNP Device," OSR's ntdev List, OSR Online Showthread, Nov. 24, 2010, [retrieved Dec. 17, 2014], 16 pages, Internet: <http://www.osronline.com/showthread.cfm?link=195315>.

No Author, "How to Differentiate a Virtual Device Arrival/Removal than a (Real) Physical Device?" Serkey, [retrieved Dec. 17, 2014], 9 pages, Internet: <http://www.serkey.com/how-to-differentiate-a-virtual-device-arrival-removal-than-a-real-physical-device-bdyzhs.html>.

* cited by examiner

IDENTIFYING AND PREVENTING REMOVAL OF VIRTUAL HARDWARE

TECHNICAL FIELD

The present disclosure is generally related to computer systems, and more particularly, to virtual device management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

A VM may comprise one or more "virtual devices," each of which may map to a physical device of the host machine (e.g., a network interface device, an I/O device such as a CD-ROM drive, a disk array, etc.). A virtualization management system, or "virtualization manager," can manage the allocation of resources from host machines to VMs, monitor the status of the VMs, as well as the progress of commands and processes being executed by the VMs, and generally manage operations in the system.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for identifying and preventing removal of virtual devices from a virtual machine. A virtualization manager can manage the allocation of virtual devices on a VM to physical devices on a host machine. The virtualization manager can add or remove virtual devices while the VM is running without needing to stop the VM. However, the virtualization manager may not always be able to determine if removal of a virtual device can be completed safely without disrupting the execution of the VM. Removal of a virtual device while the virtual device is actively being used by the VM could result in data loss, failure of a process running on the VM, or an unrecoverable failure of the VM itself. For example, if a VM was in the process of interacting with a virtual interface (such as a networking device), removal of the virtual interface while the VM was transferring packets to the networking device could result in dropped networking packets. Similarly, removing a virtual disk from the VM while the VM is executing an I/O instruction could result in loss or corruption of critical data. In some cases, the virtualization manager may prevent removal of any virtual device if the VM is running at the time the removal request is made. However, this approach is inflexible and results in wasted resources since it prevents removal of virtual devices until a VM is completely shut down regardless of whether or not the devices are actually being used.

Aspects of the present disclosure address the above noted deficiency by permitting virtual device removal without shutting down a VM as long as the virtual device is not being used. The virtualization manager can determine whether or not a particular virtual device is in use based on usage statistics collected from the hypervisor associated with the VM. Additionally or alternatively, the virtualization manager can send a request to an agent running on the associated hypervisor to determine the current use status of the virtual device at the time of the request. If the virtualization manager determines that the virtual device is being used, a removal request can be blocked until a confirmation is received.

In an illustrative example, a virtualization manager can collect usage statistics for a virtual device associated with a virtual machine. The usage statistics may be collected from the hypervisor associated with the virtual machine continuously during the execution of the virtual machine. Alternatively, the statistics may be collected intermittently at predefined time intervals. For example, the virtualization manager may send a request to an agent running on the hypervisor every 5 seconds (or at any other configurable interval) to obtain usage statistics for any virtual device associated with the virtual machine. The virtualization manager may then receive the statistics and save them to a database for later use. The usage statistics may be composed of any information tracked by the hypervisor that pertains to the functioning of the virtual device. For example, the usage statistics for a virtual disk may comprise the total number of reads, total number of writes, the number of reads per second, or the like. The usage statistics for a networking device may comprise the total time to complete a task (e.g., the total time to process a networking packet) or the total bandwidth for the device. Total bandwidth may be assessed using current or average receive rate and transmit rate for the device (e.g., measured in bits per second).

The virtualization manager may then calculate an average usage value for the virtual device in view of the collected statistics. The virtualization manager may calculate the average usage value over a particular time period, replacing the previous value. For example, the virtualization manager may calculate the average value of statistics collected over a period of 30 seconds. Alternatively, the virtualization manager may calculate a rolling average over a particular period of time. The virtualization manager may save the average usage value in a database, in a memory, or in any similar manner. The virtualization manager may calculate the average usage value intermittently apart from any disconnect request, or in the alternative, may calculate the average usage value only when a request is received to disconnect a virtual device.

The virtualization manager may receive a request to disconnect the virtual device from the virtual machine. The request may be received from a user of the virtualization manager (e.g., an administrator) via a user interface (e.g., a graphical user interface, command line interface, etc.). Alternatively, the request may be received from a source outside of the virtualization manager (e.g., a user with access to the hypervisor or a component or module of the virtualized environment that may send a request to disconnect a virtual device programmatically).

The virtualization manager may then determine a usage state of the virtual device in view of the calculated average usage value. In certain implementations, the virtualization manager may determine the usage state of the virtual device by comparing the calculated average usage value to a predetermined threshold condition. Alternatively, the virtualization manager may use any other statistical information received from the associated hypervisor that can indicate usage patterns of a virtual device. For example, the virtualization manager may use the collected statistics to determine if there was any access of the virtual device by the virtual machine within a time period (e.g., within the previous 30 seconds) rather than calculate an average usage.

If the virtualization manager determines that the average usage value meets the predetermine threshold condition, the virtualization manager may set the usage state to indicate that the virtual device is in use. For example, if the virtualization manager determines that the average number of operations processed by the virtual device over a particular period of time prior to the disconnect request is greater than a minimum threshold number (e.g., greater than zero) the usage state may be set to "in use." Conversely, if the virtualization manager determines that the average usage value does not meet the predetermine threshold condition, the virtualization manager may set the usage state to indicate that the virtual device is "not in use."

In certain implementations, the virtualization manager may determine the usage state of the virtual device in view of a current use status of the virtual device. The virtualization manager may first identify the hypervisor associated with the virtual machine. The virtualization manager may then obtain the current use status for the virtual device from an agent running on the identified hypervisor. The agent may be the same component of the hypervisor that sends the usage statistics to the virtualization manager. Alternatively, the agent may be a different component of the hypervisor that is specifically configured to return the current use status of the virtual device. The virtualization manager may send a request for the current use status to the agent using an application programming interface (API) that facilitates sending an identifier for the virtual device to the agent and receiving a current use status from the agent.

Once the agent receives the request from the virtualization manager, the agent may determine the current use status of the virtual device. To determine the status, the agent may invoke an operating system command to determine if there is any activity on the device at the time of the request. For example, to determine the current status of a virtual interface, the agent can invoke a command to monitor traffic across the network for the virtual interface (e.g., a Linux TCPDUMP command). Alternatively, to determine the current status of a virtual disk, the agent can invoke a command to determine if the associated disk image is being accessed (e.g., a Linux IOTOP command). If the results of the command indicate that there is current activity for the virtual device, the agent can set the current use status to indicate that the virtual device is currently in use. Otherwise, the agent can set the current use status to indicate that the virtual device is not currently in use.

The virtualization manager may receive the current use status from the hypervisor agent and determine the usage state using the current use status. If the virtualization manager determines that the current use status indicates that the virtual device is currently being used by the virtual machine, the virtualization manager may set the usage state of the virtual device to indicate that the virtual device is in use. Conversely, if the virtualization manager determines that the current use status indicates that the virtual device is not currently being used by the virtual machine, the virtualization manager may set the usage state of the virtual device to indicate that the virtual device is not in use.

In some implementations, the virtualization manager may use either the average usage value or the current use status to determine the usage state for the virtual device. Alternatively, the virtualization manager may use a combination of the two methods. In an illustrative example, the virtualization manager may first calculate the average usage value. If the virtualization manager determines that the virtual device is in use based on the average usage value as described above, the virtualization manager may bypass checking the current use status. If, however, the virtualization manager determines that the virtual device is not in use based on the average usage value, the virtualization manager may only then check the current use status. In implementations where the statistics are captured by the virtualization manager apart from any request to disconnect a virtual device, utilizing the combination of the two methods can reduce response time by using the average usage value first since the statistics may already have been captured.

Once the virtualization manager has determined the usage state of the virtual device, the virtualization manager may allow the request to disconnect the virtual device or request confirmation. In response to determining that the usage state of the virtual device indicates that the virtual device is not in use, the virtualization manager may proceed with disconnecting the virtual device from the virtual machine. In response to determining that the usage state of the virtual device indicates that the virtual device is in use, the virtualization manager may take additional steps to prevent a potentially harmful removal of the device. In some implementations, the virtualization manager may reject the request to disconnect the virtual device, blocking its removal until the virtualization manager determines that the device is no longer in use. The virtualization manager may then set a timer and recheck the usage state of the virtual device upon the expiration of the timer.

Alternatively, the virtualization manager may send a notification to the requestor to confirm removal of the virtual device. For example, if the request originated with a user via a user interface (e.g., a graphical user interface, command line interface, etc.), the virtualization manager may send a request to the user to confirm disconnecting the device from the virtual machine. This may be accomplished by displaying a notification screen, window, or dialog box on the user interface that notifies the user that the virtual device is being used and disconnecting it may be harmful (e.g., may cause data loss, connectivity problems, etc.). The notification may contain a button, checkbox, or other method of soliciting input from the user to confirm disconnecting the virtual device. Once confirmed by the user (e.g. by clicking a button on the notification screen presented by the graphical user interface), the virtualization manager may proceed with disconnecting the virtual device.

Aspects of the present disclosure are thus capable of identifying and preventing harmful removal of virtual devices from virtual machines. More particularly, aspects of the present disclosure can prevent harmful data loss or networking failures by determining whether a virtual device is in use prior to processing a disconnect request.

Figure 1:
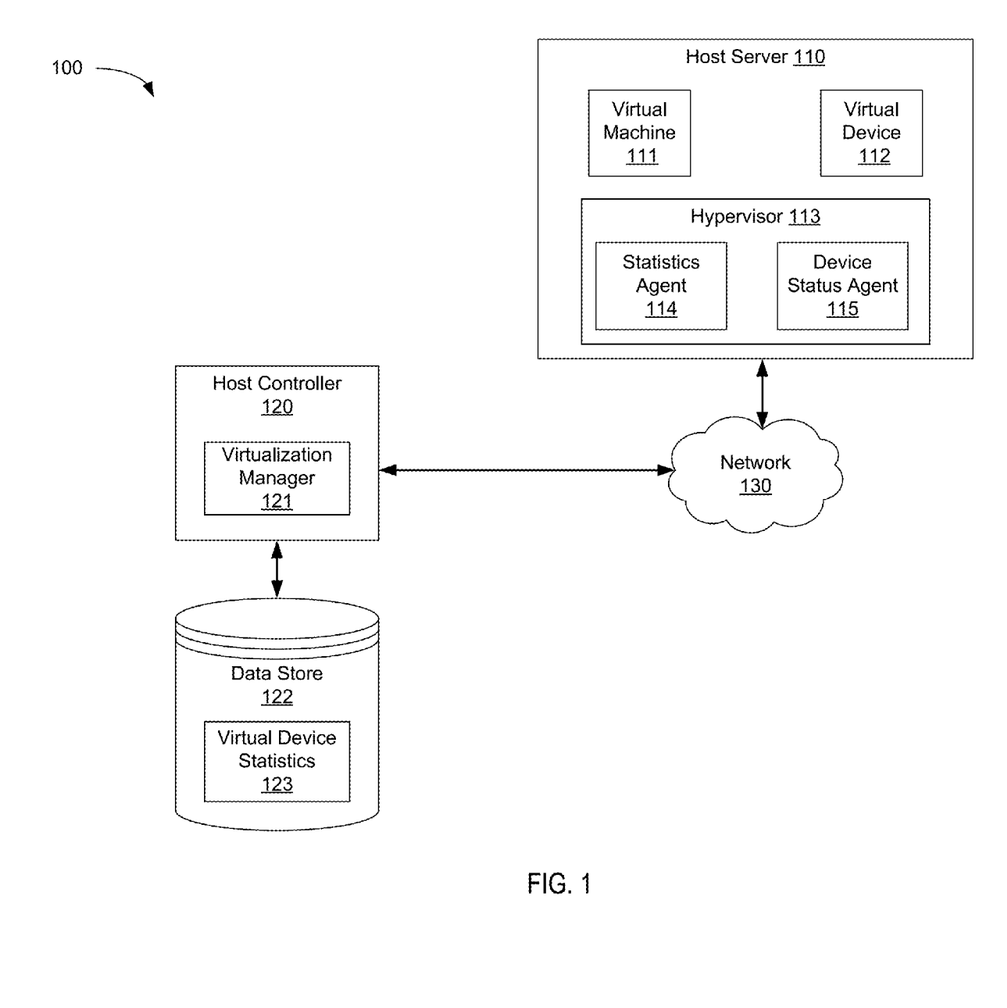
FIG. 1 depicts a high-level component diagram of an example computer system architecture, in accordance with one or more aspects of the present disclosure.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 includes one or more host servers 110 coupled to a host controller 120 over a network 130. The network 130 may be a private network (e.g., a local area network (LAN), wide area network (WAN), intranet, etc.) or a public network (e.g., the Internet). Host controller 120 may be an independent machine such as a server computer, a desktop computer, etc. Alternatively, the host controller 120 may be part of the host server 110.

Host server 110 may comprise server computers or any other computing devices capable of running one or more external virtual machines (VM) 111. Each VM 111 runs a guest operating system (OS) (not pictured) that may be different from one virtual machine to another. The guest OS may include Microsoft Windows, Linux, Solaris, Mac OS, etc. The host server 110 may also comprise one or more virtual device 112 that maps to a physical device of host server 110 (e.g., a network interface device, an I/O device such as a CD-ROM driver, a disk array, etc.). The host server 110 may also comprise a hypervisor 113 that emulates the underlying hardware platform for VM 111. The hypervisor 113 may also be known as a virtual machine monitor (VMM) or a kernel-based hypervisor.

The hypervisor 113 may comprise a statistics agent 114 that monitors VMs (e.g., VM 111) that are running on host server 110. Statistics agent 114 can monitor VM runtime status, hardware configuration, network and storage connectivity on the host server 110, and similar VM-related and host-related statistical information. The statistics agent 114 may store this information as it is collected for later use by the virtualization manager 121. For example, the statistics agent 114 may save this information in a local memory space. Alternatively, the statistics agent 114 may save the information to a data store accessible by the host server 110. The statistics agent 114 can send and receive information regarding VM 111 via an API that allows statistics agent 114 to communicate with other components of network architecture 100.

The hypervisor 113 may additionally comprise a device status agent 115 that can determine the current status of virtual devices (e.g., virtual device 112) associated with a VM (e.g., VM 111) running on host server 110, as described in detail below with respect to FIG. 6. Device status agent 115 can invoke an operating system command to determine whether virtual device 112 is currently in use. Device status agent 115 may store this information as it is collected for later use by the virtualization manager 121. For example, device status agent 115 may save this information in a local memory space. Alternatively, device status agent 115 may save the information to a data store accessible by the host server 110. Device status agent 115 can send and receive information regarding virtual device 112 via an API that allows device status agent 115 to communicate with other components of network architecture 100.

Each external VM 111 may be linked to one or more virtual disks (not shown). These virtual disks can be logical partitions of a physical disk managed by hypervisor 113, can be cloud based storage devices, or can be some other type of virtual storage device. In one embodiment, virtual disks may form a whole or part of a logical data center. In one embodiment, external VM 111 and virtual disks, together with host server 110, may be collectively referred to as entities in a virtual machine system.

The VM 111 and virtual disks can be managed by a host controller 120 (e.g., after the host 110 has been associated with the host controller 120). Host controller 120 may manage the allocation of resources from host server 110 to VM 111. In addition, host controller may monitor the status of VM 111 as well as the progress of commands and processes being executed by VM 111 and/or on VM 111. In some implementations host controller 120 may run on a separate physical machine from the host server 110. Alternatively, host controller 120 may run on the host server 110 itself. The host controller 120 may include a virtualization manager 121 to determine the usage state of virtual device 112, as described in detail below with respect to FIGS. 3-5. The host controller 120 may also maintain a data store 122 with virtual device statistics 123 pertaining to the various virtual devices 112 in the virtualization system (e.g., virtual interfaces, virtual disks, etc.). Virtual device statistics 1123 may include data representing the statistics received from statistics agent 114, as well as the calculated average usage values for each monitored virtual device 112. The data store 122 may share the machine with the host controller 120 (e.g., a disk drive in the host controller computer) or be an independent device coupled to the host controller directly or via a network (e.g., as a network-attached storage device (NAS)).

Figure 2:
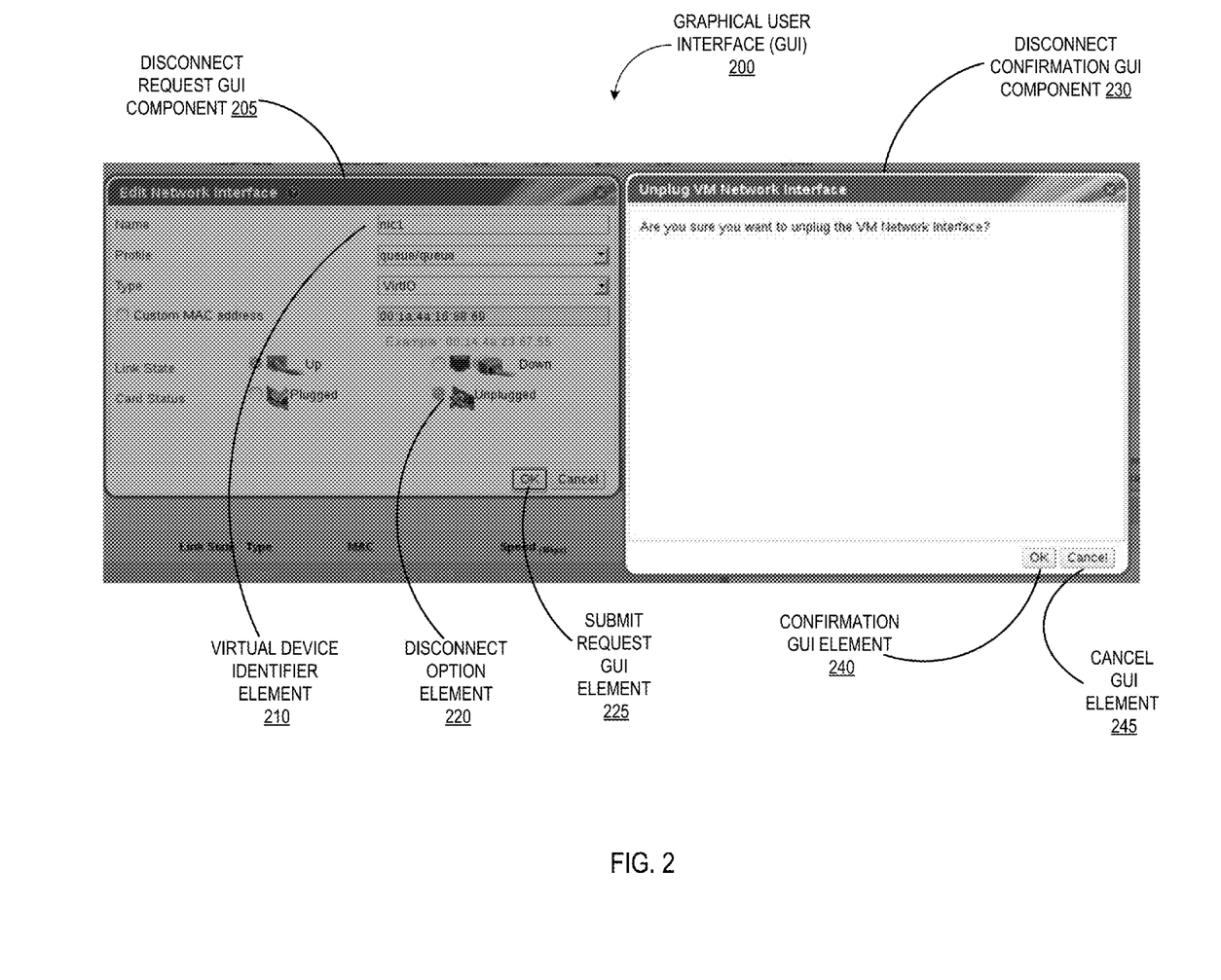
FIG. 2 illustrates an example of a graphical user interface (GUI) for disconnecting a virtual device, in accordance with one or more aspects of the present disclosure.

FIG. 2 illustrates an example of a graphical user interface (GUI) 200 for disconnecting a virtual device. GUI 200 may be presented by a stand-alone application, a component of a user interface for a virtualization manager, or in any other manner. For example, GUI 200 may be presented to a user by virtualization manager 121 of FIG. 1 as described in detail below with respect to FIGS. 3-5.

GUI 200 may present disconnect request GUI component 205 to a user in order to submit a request to a virtualization manager to disconnect a virtual device from a virtual machine. The user may enter identification information in virtual device identifier element 210 that can specify the virtual device that the user wishes to disconnect from the virtual machine. Disconnect option element 220 can be an input field that allows the user to specify that the request is to disconnect the virtual device. The user can submit the disconnect request for the virtual device specified in virtual device identifier element 210 by selecting submit request GUI element 225. In FIG. 2, submit request GUI element is represented as an 'OK' button, but can be a link, dropdown box, or any similar element that may submit the request.

Once the user selects submit request GUI element 225 on disconnect request GUI component 205, the virtualization manager can determine if the virtual device is in use prior to disconnecting it as described in detail below with respect to FIGS. 3-5. If the virtualization manager determines that the usage state of the virtual device indicates that the virtual device is in use by the virtual machine, the virtualization manager may display disconnect confirmation GUI component 230 in GUI 200 to request confirmation from the user. The user may continue with disconnecting the virtual device by selecting confirmation GUI element 240 in disconnect confirmation GUI component 230 (e.g., by clicking an 'OK' button). The user may cancel the disconnect request (e.g., if disconnecting the virtual device may result in data loss or connectivity loss, etc.) by selecting cancel GUI element 245 (e.g., by clicking a 'Cancel' button). In FIG. 2, confirmation GUI element 240 and cancel GUI element 245 are represented as buttons on a graphical user interface, but in other implementations can be links, dropdown lists, checkboxes, or any other GUI elements that provide similar functionality.

Figure 3:
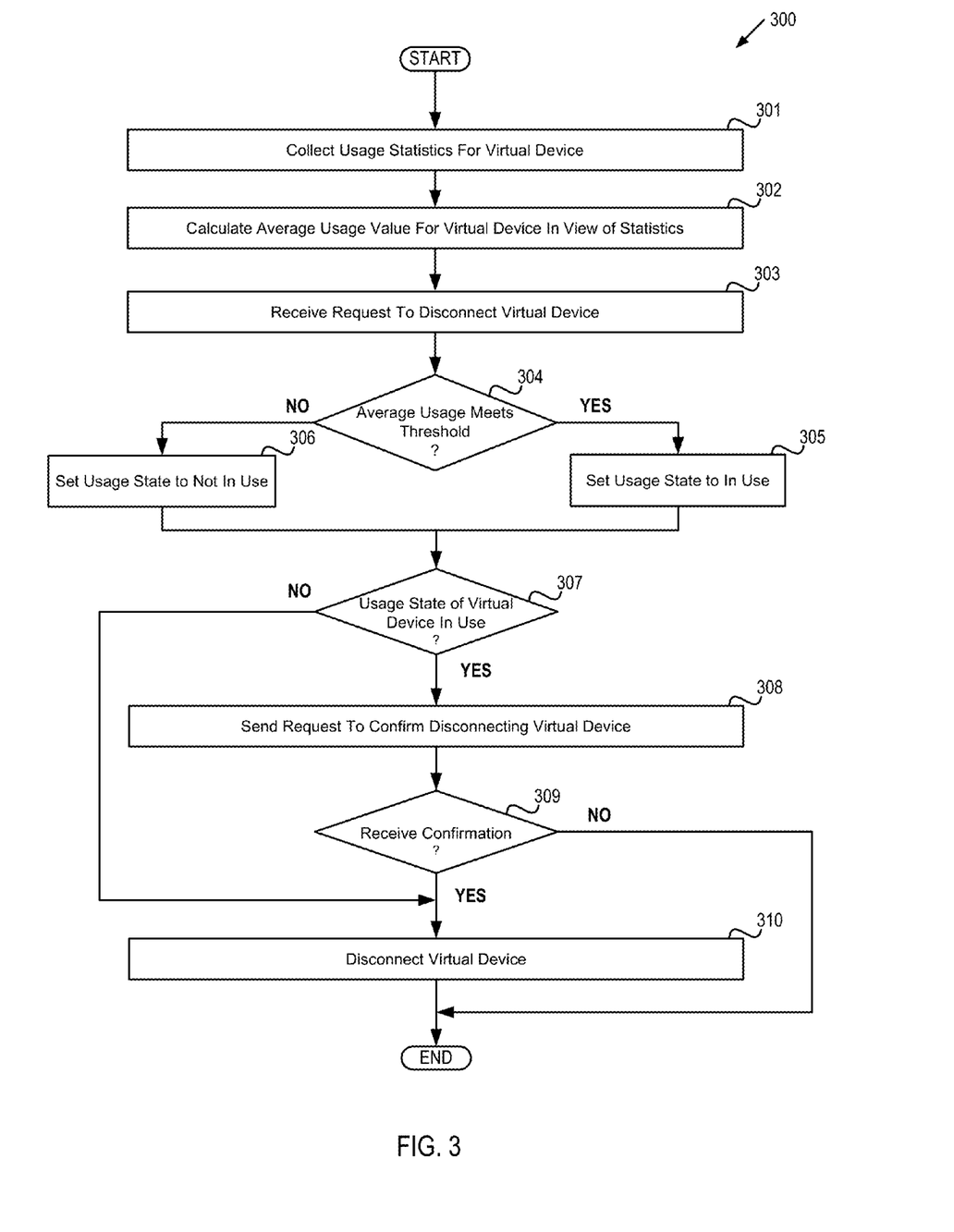
FIG. 3 depicts a flow diagram of a method for determining the usage state of a virtual device using average usage statistics, in accordance with one or more aspects of the present disclosure.

FIG. 3 depicts a flow diagram of an example method 300 for determining the usage state of a virtual device using average usage statistics. The method may be performed by processing logic that may comprise hardware (circuitry, dedicated logic, etc.), software (such as is run on a general purpose computer system or a dedicated machine), or a combination of both. In one illustrative example, method 300 may be performed by virtualization manager 121 of host controller 120 in FIG. 1. Alternatively, some or all of method 300 might be performed by another module or machine. It should be noted that blocks depicted in FIG. 3 could be performed simultaneously or in a different order than that depicted.

At block 301, processing logic collects usage statistics for a virtual device associated with a virtual machine. The usage statistics may be collected from the hypervisor associated with the virtual machine continuously during the execution of the virtual machine. Alternatively, the statistics may be collected intermittently at predefined time intervals. For example, the virtualization manager may send a request to an agent running on the hypervisor every 5 seconds (or at any other configurable interval) to obtain usage statistics for any virtual device associated with the virtual machine. The virtualization manager may then receive the statistics and save them to a database for later use. The usage statistics may be composed of any information tracked by the hypervisor that pertains to the functioning of the virtual device. For example, the usage statistics for a virtual disk may comprise the total number of reads, total number of writes, the number of reads/second, or the like. The usage statistics for a networking device may comprise the total time to complete a task (e.g., the total time to process a networking packet) or the total bandwidth for the device.

At block 302, processing logic calculates an average usage value for the virtual device in view of the collected usage statistics. Processing logic may calculate the average usage value over a particular time period, replacing the previous value. For example, the virtualization manager may calculate the average value of statistics collected over a period of 30 seconds. Alternatively, processing logic may calculate a rolling average over a particular period of time. Processing logic may save the average usage value in a database, in a memory, or in any similar manner. Processing logic may calculate the average usage value intermittently apart from any disconnect request, or in the alternative, may calculate the average usage value only when a request is received to disconnect a virtual device.

At block 303, processing logic receives a request to disconnect the virtual device from the virtual machine. The request may be received from a user of a virtualization manager via a user interface (e.g., an administrator). Alternatively, the request may be received from a source outside of a virtualization manager (e.g., a user with access to the hypervisor or a component or module of the virtualized environment that may disconnect virtual devices programmatically).

At blocks 304-306, processing logic can set a usage state of the virtual device by determining whether the average usage value meets a threshold condition. If processing logic determines at block 304 that the average usage value meets the predetermine threshold condition, processing logic may proceed to block 305 to set the usage state to indicate that the virtual device is in use. For example, if processing logic determines that the average number of operations processed by the virtual device over a particular period of time prior to the disconnect request is greater than a minimum threshold number (e.g., greater than zero) the usage state may be set to "in use." Conversely, if processing logic determines at block 304 that the average usage value does not meet the predetermined threshold condition, processing logic may proceed to block 306 to set the usage state to indicate that the virtual device is "not in use."

At block 307, processing logic determines whether the usage state indicates that the virtual device is in use. If so, processing continues to block 308. Otherwise, processing proceeds to block 310.

At block 308, processing logic sends a request to confirm disconnecting the virtual device. For example, if the request originated with a user via a user interface, processing logic may send a request to the user to confirm disconnecting the device from the virtual machine. This may be accomplished by displaying a notification screen, window, or dialog box on the user interface that notifies the user that the virtual device is being used and disconnecting it may be harmful (e.g., may cause data loss, connectivity problems, etc.). The notification may contain a button, checkbox, or other method of soliciting input from the user to confirm disconnecting the virtual device.

At block 309, processing logic determines whether confirmation has been received. If so, processing continues to block 310. Otherwise, the method of FIG. 3 terminates without disconnecting the virtual device. For example, the notification at block 308 may be presented to a user on a graphical user interface with a confirmation button for the user to press to confirm the disconnect request, and a cancel button to cancel the disconnect request. Processing logic may receive the confirmation when the user clicks the confirmation button. Conversely, if the user clicks cancel, the method of FIG. 3 terminates without disconnecting the virtual device.

At block 310, processing logic disconnects the virtual device from the virtual machine. After block 310, the method of FIG. 3 terminates.

Figure 4:
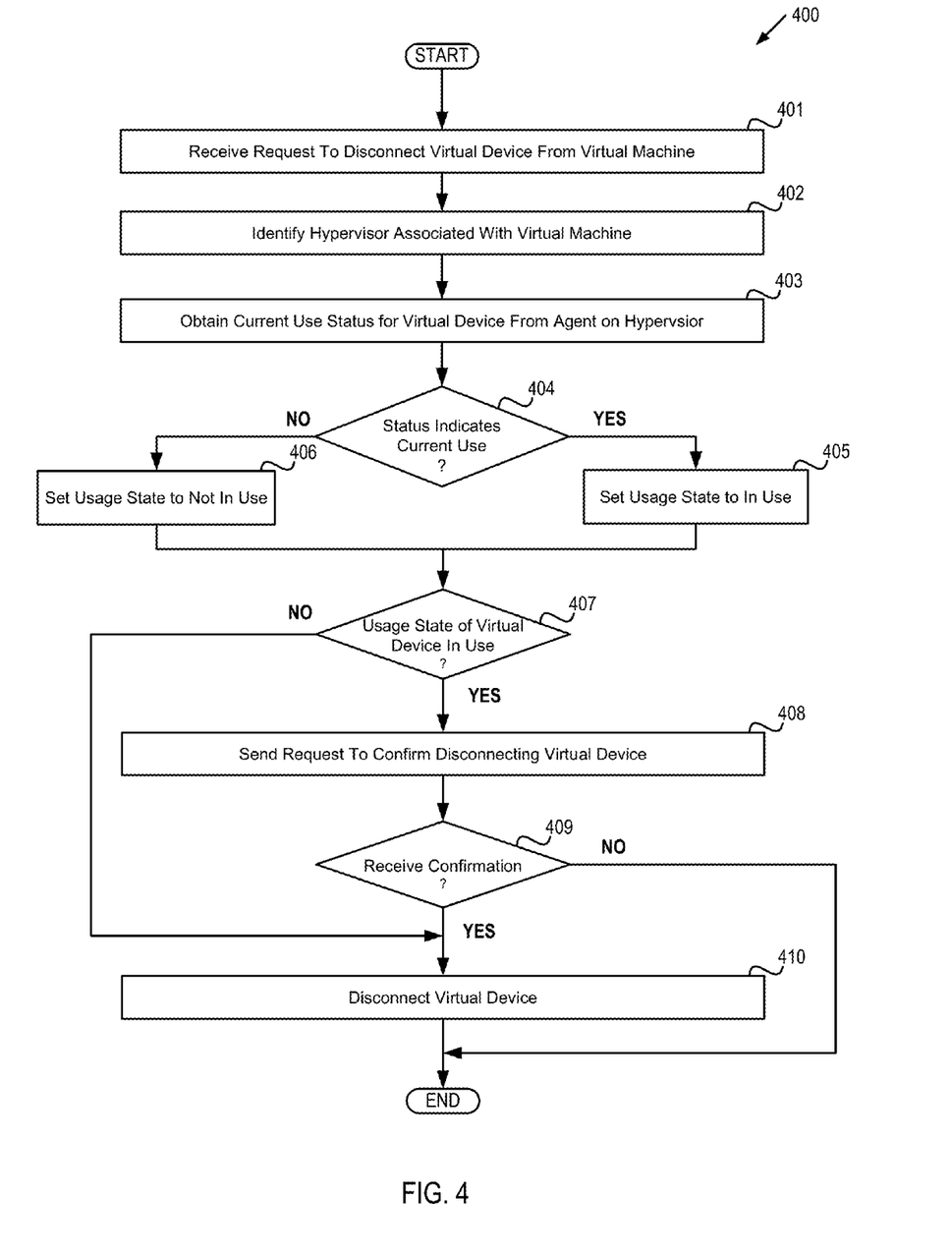
FIG. 4 depicts a flow diagram of a method for determining the usage state of a virtual device using current use status of the virtual device, in accordance with one or more aspects of the present disclosure.

FIG. 4 depicts a flow diagram of an example method 400 for determining the usage state of a virtual device using current use status of the virtual device. The method may be performed by processing logic that may comprise hardware (circuitry, dedicated logic, etc.), software (such as is run on a general purpose computer system or a dedicated machine), or a combination of both. In one illustrative example, method 400 may be performed by virtualization manager 121 of host controller 120 in FIG. 1. Alternatively, some or all of method 400 might be performed by another module or machine. It should be noted that blocks depicted in FIG. 4 could be performed simultaneously or in a different order than that depicted.

At block 401, processing logic receives a request to disconnect the virtual device from the virtual machine. The request may be received from a user of a virtualization manager via a user interface (e.g., an administrator). Alternatively, the request may be received from a source outside of a virtualization manager (e.g., a user with access to the hypervisor or a component or module of the virtualized environment that may disconnect virtual devices programmatically).

At block 402, processing logic identifies a hypervisor associated with the virtual machine. At block 403, processing logic obtains a current use status for the virtual device from an agent executing on the associated hypervisor. The agent may be a component of the hypervisor that is specifically configured to return the current use status of the virtual device. Processing logic may send a request for the current use status to the agent using an application programming interface (API) that facilitates sending an identifier for the virtual device to the agent and receiving a current use status from the agent. The agent may determine the current use status as described in further detail below with respect to FIG. 6.

At block 404, processing logic determines whether the current use status indicates that the virtual device is in use. If so, processing logic proceeds to block 405 to set the usage state to in use. If not, processing logic proceeds to block 406 to set the usage state to not in use. At block 407, processing logic determines whether the usage state indicates that the virtual device is in use. If so, processing continues to block 408. Otherwise, processing proceeds to block 410.

At block 408, processing logic sends a request to confirm disconnecting the virtual device. For example, if the request originated with a user via a user interface, processing logic may send a request to the user to confirm disconnecting the device from the virtual machine. This may be accomplished by displaying a notification screen, window, or dialog box on the user interface that notifies the user that the virtual device is being used and disconnecting it may be harmful (e.g., may cause data loss, connectivity problems, etc.). The notification may contain a button, checkbox, or other method of soliciting input from the user to confirm disconnecting the virtual device.

At block 409, processing logic determines whether confirmation has been received. If so, processing continues to block 410. Otherwise, the method of FIG. 4 terminates without disconnecting the virtual device. For example, the notification at block 408 may be presented to a user on a graphical user interface with a confirmation button for the user to press to confirm the disconnect request, and a cancel button to cancel the disconnect request. Processing logic may receive the confirmation when the user clicks the confirmation button. Conversely, if the user clicks cancel, the method of FIG. 4 terminates without disconnecting the virtual device.

At block 410, processing logic disconnects the virtual device from the virtual machine. After block 410, the method of FIG. 4 terminates.

Figure 5:
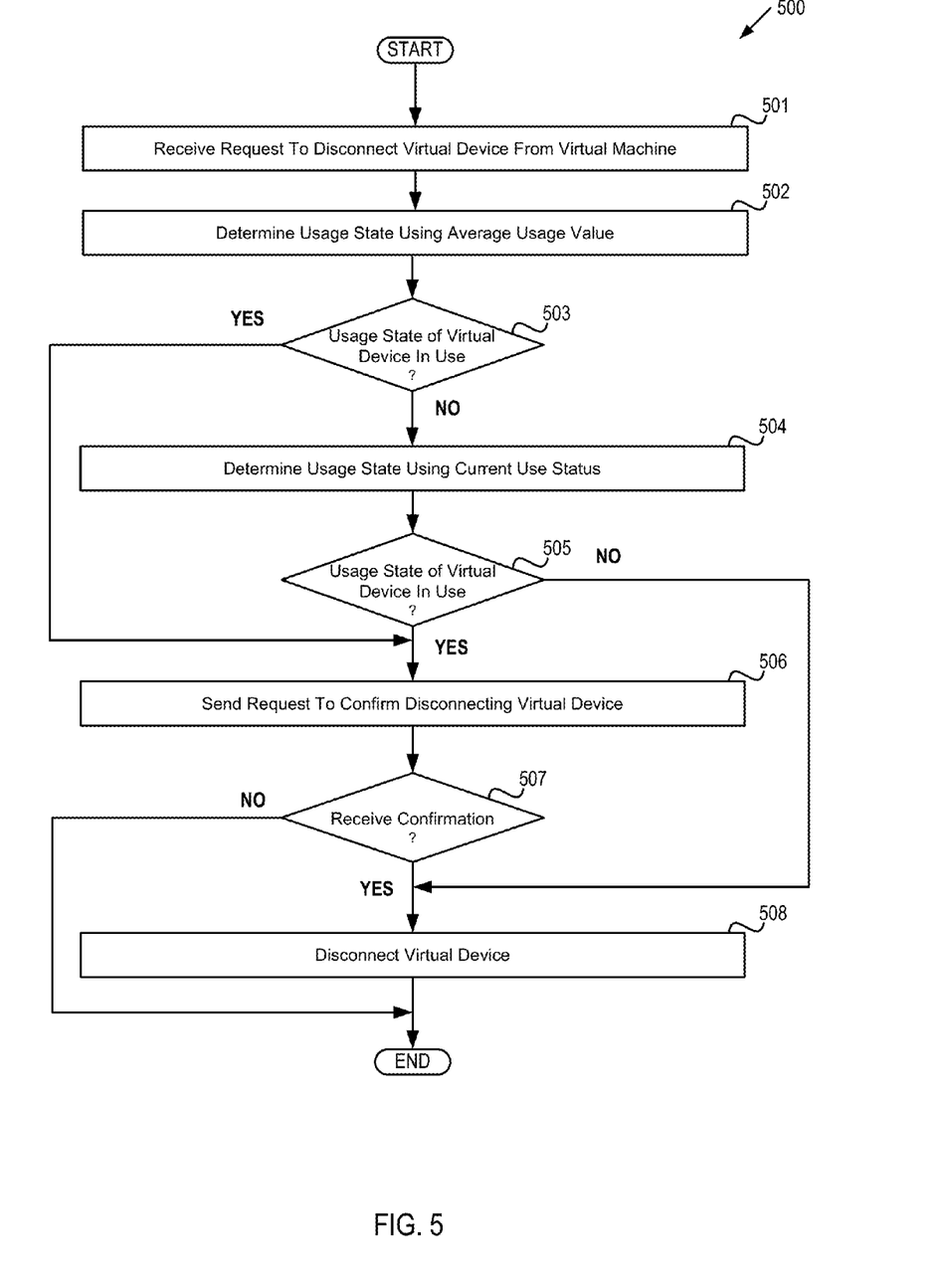
FIG. 5 depicts a flow diagram of a method for determining the usage state of a virtual device using a combination of average usage statistics and current use status of the virtual device, in accordance with one or more aspects of the present disclosure.

FIG. 5 depicts a flow diagram of an example method 500 for determining the usage state of a virtual device using a combination of average usage statistics and current use status of the virtual device. The method may be performed by processing logic that may comprise hardware (circuitry, dedicated logic, etc.), software (such as is run on a general purpose computer system or a dedicated machine), or a combination of both. In one illustrative example, method 500 may be performed by virtualization manager 121 of host controller 120 in FIG. 1. Alternatively, some or all of method 500 might be performed by another module or machine. It should be noted that blocks depicted in FIG. 5 could be performed simultaneously or in a different order than that depicted.

At block 501, processing logic receives a request to disconnect the virtual device from the virtual machine. The request may be received from a user of a virtualization manager via a user interface (e.g., an administrator). Alternatively, the request may be received from a source outside of a virtualization manager (e.g., a user with access to the hypervisor or a component or module of the virtualized environment that may disconnect virtual devices programmatically).

At block 502, processing logic determines the usage state of the virtual device using an average usage value. In some implementations, the average usage value may be determined as described in further detail above in blocks 301-306 in FIG. 3. At block 503, processing logic branches based on the usage state determined at block 502. If the usage state indicates that the virtual device is in use, processing logic continues to block 506. If the usage state indicates that the virtual device is not in use, processing logic continues to block 504.

At block 504, processing logic determines the usage state of the virtual device using the current use status. In some implementations, the current use status may be determined as described in further detail above in blocks 401-406 of FIG. 4. At block 505, processing logic branches based on the usage state determined at block 504. If the usage state indicates that the virtual device is in use, processing logic continues to block 506. If the usage state indicates that the virtual device is not in use, processing logic continues to block 508.

At block 506, processing logic sends a request to confirm disconnecting the virtual device. For example, if the request originated with a user via a user interface, processing logic may send a request to the user to confirm disconnecting the device from the virtual machine. This may be accomplished by displaying a notification screen, window, or dialog box on the user interface that notifies the user that the virtual device is being used and disconnecting it may be harmful (e.g., may cause data loss, connectivity problems, etc.). The notification may contain a button, checkbox, or other method of soliciting input from the user to confirm disconnecting the virtual device.

At block 507, processing logic determines whether confirmation has been received. If so, processing continues to block 508. Otherwise, the method of FIG. 5 terminates without disconnecting the virtual device. For example, the notification at block 506 may be presented to a user on a graphical user interface with a confirmation button for the user to press to confirm the disconnect request, and a cancel button to cancel the disconnect request. Processing logic may receive the confirmation when the user clicks the confirmation button. Conversely, if the user clicks cancel, the method of FIG. 5 terminates without disconnecting the virtual device.

At block 508, processing logic disconnects the virtual device from the virtual machine. After block 508, the method of FIG. 5 terminates.

Figure 6:
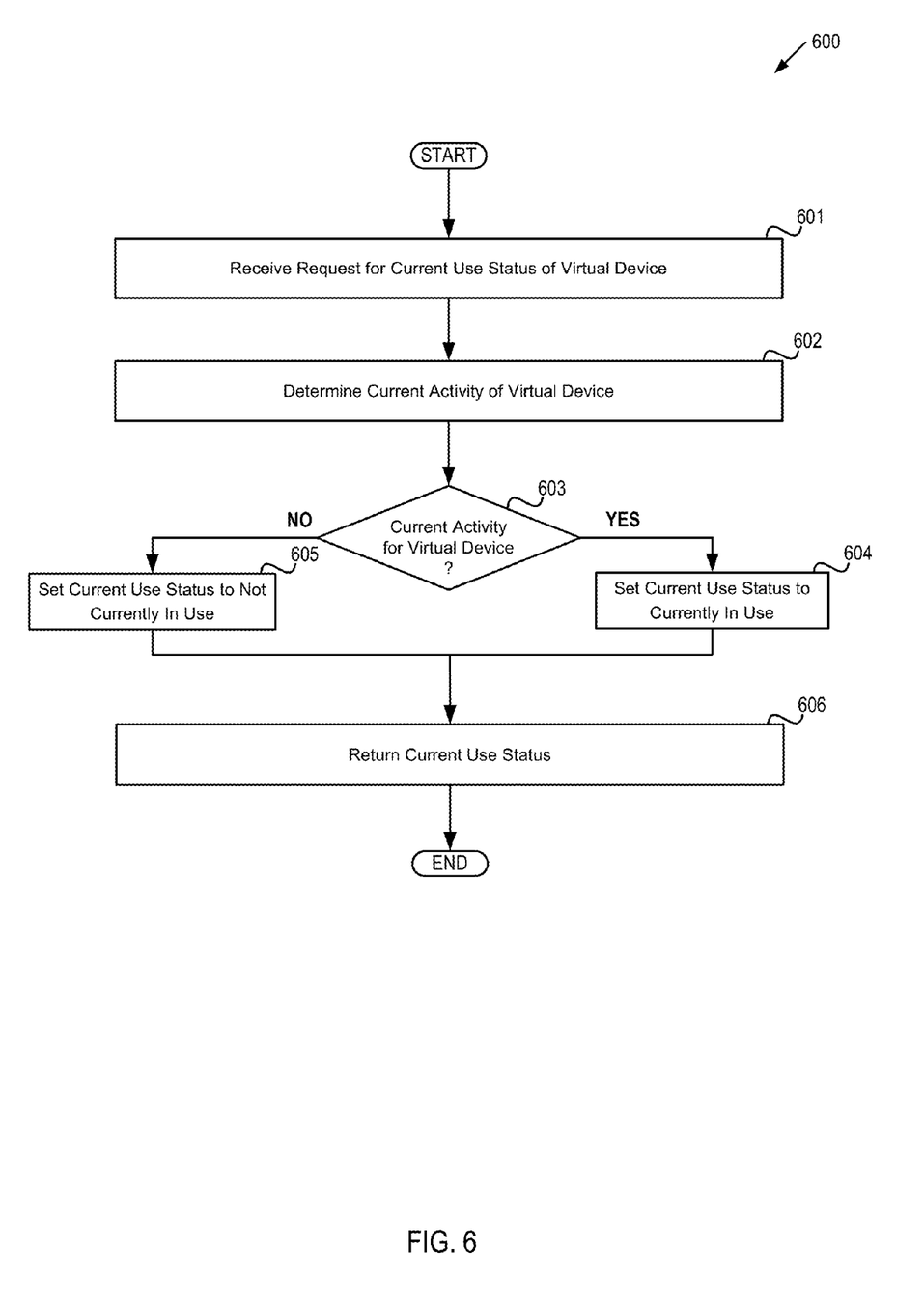
FIG. 6 depicts a flow diagram of a method for determining current use status by a hypervisor agent, in accordance with one or more aspects of the present disclosure.

FIG. 6 depicts a flow diagram of an example method 600 for determining current use status by a hypervisor agent. The method may be performed by processing logic that may comprise hardware (circuitry, dedicated logic, etc.), software (such as is run on a general purpose computer system or a dedicated machine), or a combination of both. In one illustrative example, method 600 may be performed by device status agent 115 of hypervisor 113 in FIG. 1. Alternatively, some or all of method 600 might be performed by another module or machine. It should be noted that blocks depicted in FIG. 6 could be performed simultaneously or in a different order than that depicted.

At block 601, processing logic receives a request for the current use status of a virtual device. In some implementations, the request may be received from a virtualization manager via an API that facilitates receiving an identifier for the virtual device and subsequently returning the current use status to the virtualization manager.

At block 602, processing logic determines the current activity of the virtual device. In some implementations, processing logic may invoke an operating system command to determine if there is any activity on the device at the time of the request. For example, to determine the current status of a virtual interface, processing logic can invoke a command to monitor traffic across the network for the virtual interface (e.g., a Linux TCPDUMP command). Alternatively, to determine the current status of a virtual disk, processing logic can invoke a command to determine if the associated disk image is being accessed (e.g., a Linux IOTOP command).

At block 603, processing logic sets the current use status based on whether current activity was detected for the device at block 602. If so, processing logic continues to block 604 where it sets the current use status to "currently in use". Otherwise, processing logic continues to block 605 where it sets the current use status to "not currently in use."

At block 606, processing logic returns the current use status to the requestor. If the request originated from the virtualization manager, the current use status may be returned via the API used to send the request. After block 606, the method of FIG. 6 terminates.

Figure 7:
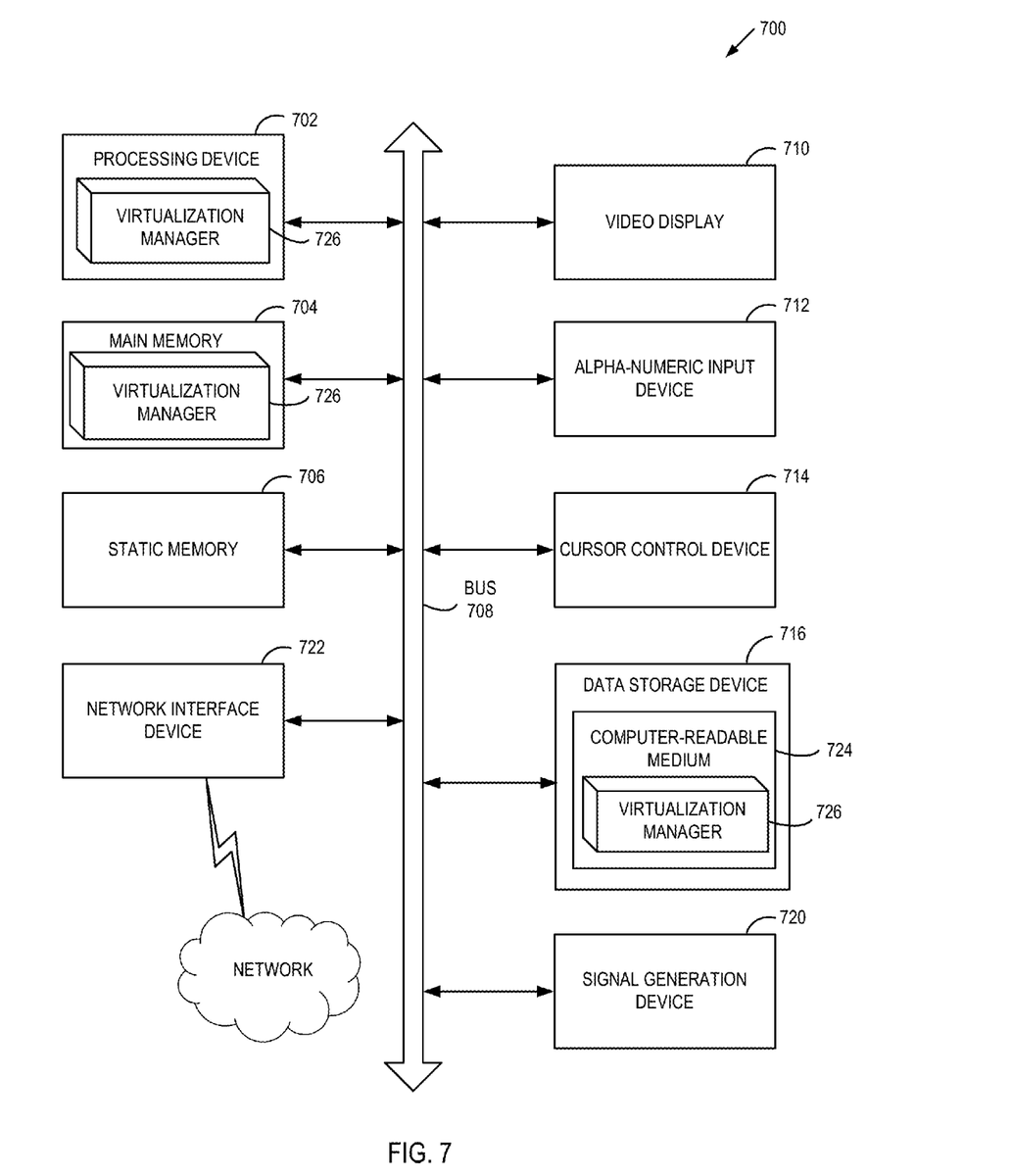
FIG. 7 depicts a block diagram of an illustrative computer system operating in accordance with examples of the invention.

FIG. 7 depicts an example computer system 700 which can perform any one or more of the methods described herein. In one example, computer system 700 may correspond to network architecture 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary network architecture 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute virtualization manager 726 for performing the operations and steps discussed herein (e.g., corresponding to the methods of FIGS. 3-5, etc.).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a computer-readable medium 724 on which is stored virtualization manager 726 (e.g., corresponding to the methods of FIGS. 3-5, etc.) embodying any one or more of the methodologies or functions described herein. Virtualization manager 726 may also reside, completely or at least partially, within the main memory 704 and/or within the processing device 702 during execution thereof by the computer system 700, the main memory 704 and the processing device 702 also constituting computer-readable media. Virtualization manager 726 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "collecting," "sending," "receiving," "determining," "disconnecting," "obtaining," "calculating," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   collecting, by a processing device executing a virtualization manager, usage statistics for a virtual device associated with a virtual machine;
   receiving, by the virtualization manager, a request to disconnect the virtual device;
   calculating, by the virtualization manager, an average usage value for the virtual device in view of the collected usage statistics;
   responsive to determining that the average usage value meets a predetermined threshold condition, setting a usage state of the virtual device to indicate that the virtual device is in use;
   responsive to determining that the average usage value does not meet the predetermined threshold condition, setting the usage state of the virtual device to indicate that the virtual device is not in use;
   responsive to determining that the usage state of the virtual device indicates that the virtual device is in use, sending a request to a client device for a confirmation to disconnect the virtual device from the virtual machine while the usage state of the virtual device indicates that the virtual device is in use; and
   responsive to receiving the confirmation from the client device to disconnect the virtual device, disconnecting the virtual device from the virtual machine.

2. The method of claim 1, further comprising:
   responsive to determining that the usage state of the virtual device indicates that the virtual device is not in use, disconnecting the virtual device from the virtual machine.

3. The method of claim 1, further comprising:
identifying a hypervisor associated with the virtual machine; and
obtaining a current use status for the virtual device from an agent running on the hypervisor associated with the virtual machine.

4. The method of claim 3, wherein setting the usage state of the virtual device is further in view of the current use status of the virtual device.

5. The method of claim 1, wherein calculating the average usage value for the virtual machine comprises calculating a rolling average usage value over a predetermined period of time.

6. The method of claim 4, wherein setting the usage state of the virtual device further in view of the current use status comprises:
responsive to determining that the current use status indicates that the virtual device is currently being used by the virtual machine, setting the usage state to indicate that the virtual device is in use; and
responsive to determining that the current use status indicates that the virtual device is not currently being used by the virtual machine, setting the usage state to indicate that the virtual device is not in use.

7. A computing apparatus comprising:
a memory; and
a processing device, operatively coupled to the memory, to:
calculate an average usage value for a virtual device associated with a virtual machine in view of collected usage statistics for the virtual device; and
responsive to determining that the average usage value meets a predetermined threshold condition, set a usage state of the virtual device to indicate that the virtual device is in use; and
responsive to determining that the average usage value does not meet the predetermined threshold condition, set the usage state of the virtual device to indicate that the virtual device is not in use;
responsive to determining that the usage state of the virtual device indicates that the virtual device is in use, send a request to a client device for a confirmation to disconnect the virtual device from the virtual machine while the usage state of the virtual device indicates that the virtual device is in use.

8. The apparatus of claim 7, wherein the processing device is further to:
collect the usage statistics for the virtual device associated with a virtual machine;
receive a request to disconnect the virtual device;
responsive to receiving the confirmation from the client device to disconnect the virtual device, disconnect the virtual device from the virtual machine; and
responsive to determining that the usage state of the virtual device indicates that the virtual device is not in use, disconnecting the virtual device from the virtual machine.

9. The apparatus of claim 7, wherein the processing device is further to:
identify a hypervisor associated with the virtual machine; and
obtain a current use status for the virtual device from an agent running on the hypervisor associated with the virtual machine.

10. The apparatus of claim 9, wherein the processing device is to set the usage state of the virtual device further in view of the current use status of the virtual device.

11. The apparatus of claim 7, wherein to calculate the average usage value for the virtual machine, the processing device is to calculate a rolling average usage value over a predetermined period of time.

12. The apparatus of claim 10, wherein to set the usage state of the virtual device further in view of the current use status, the processing device is to:
responsive to determining that the current use status indicates that the virtual device is currently being used by the virtual machine, set the usage state to indicate that the virtual device is in use; and
responsive to determining that the current use status indicates that the virtual device is not currently being used by the virtual machine, set the usage state to indicate that the virtual device is not in use.

13. A non-transitory computer readable storage medium, having instructions stored therein, which when executed by a processing device of a computer system, cause the processing device to:
collect, by the processing device executing a virtualization manager, usage statistics for a virtual device associated with a virtual machine;
receive, by the virtualization manager, a request to disconnect the virtual device;
calculate, by the virtualization manager, an average usage value for the virtual device in view of the collected usage statistics;
responsive to determining that the average usage value meets a predetermined threshold condition, set a usage state of the virtual device to indicate that the virtual device is in use; and
responsive to determining that the average usage value does not meet the predetermined threshold condition, set the usage state of the virtual device to indicate that the virtual device is not in use;
responsive to determining that the usage state of the virtual device indicates that the virtual device is in use, send a request to a client device for a confirmation to disconnect the virtual device from the virtual machine while the usage state of the virtual device indicates that the virtual device is in use;
responsive to receiving the confirmation from the client device to disconnect the virtual device, disconnecting the virtual device from the virtual machine; and
responsive to determining that the usage state of the virtual device indicates that the virtual device is not in use, disconnect the virtual device from the virtual machine.

14. The non-transitory computer readable storage medium of claim 13, wherein the processing device is further to:
identify a hypervisor associated with the virtual machine; and
obtain a current use status for the virtual device from an agent running on the hypervisor associated with the virtual machine.

15. The non-transitory computer readable storage medium of claim 14, wherein the processing device is to set the usage state of the virtual device further in view of the current use status of the virtual device.

16. The non-transitory computer readable storage medium of claim 13, wherein to calculate the average usage value for the virtual machine, the processing device is to calculate a rolling average usage value over a predetermined period of time.

17. The non-transitory computer readable storage medium of claim 15, wherein to set the usage state of the virtual device further in view of the current use status, the processing device is to:
- responsive to determining that the current use status indicates that the virtual device is currently being used by the virtual machine, set the usage state to indicate that the virtual device is in use; and
- responsive to determining that the current use status indicates that the virtual device is not currently being used by the virtual machine, set the usage state to indicate that the virtual device is not in use.

\* \* \* \* \*